(12) United States Patent
Rhim

(10) Patent No.: US 10,852,719 B2
(45) Date of Patent: Dec. 1, 2020

(54) SERVER, ELECTRONIC DEVICE, AND ELECTRONIC DEVICE INFORMATION PROVIDING METHOD

(71) Applicant: SAMSUNG ELECTRONICS CO., LTD., Suwon-si (KR)

(72) Inventor: Eun-Hee Rhim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 15/565,019

(22) PCT Filed: Mar. 28, 2016

(86) PCT No.: PCT/KR2016/003128
§ 371 (c)(1),
(2) Date: Oct. 6, 2017

(87) PCT Pub. No.: WO2016/163674
PCT Pub. Date: Oct. 13, 2016

(65) Prior Publication Data
US 2018/0120826 A1    May 3, 2018

(30) Foreign Application Priority Data

Apr. 7, 2015 (KR) .......................... 10-2015-0049160

(51) Int. Cl.
*G05B 23/02* (2006.01)
*G06K 9/62* (2006.01)
(Continued)

(52) U.S. Cl.
CPC .......... *G05B 23/0254* (2013.01); *G06F 11/22* (2013.01); *G06K 9/6267* (2013.01);
(Continued)

(58) Field of Classification Search
CPC .................................................. G05B 23/0254
(Continued)

(56) References Cited

U.S. PATENT DOCUMENTS 6,405,108 B1   6/2002 Patel et al.
6,906,617 B1   6/2005 Van der Meulen
(Continued)

OTHER PUBLICATIONS

International Search Report and Written Opinion, issued by International Searching Authority in corresponding International Application No. PCT/KR2016/003128, dated Jul. 8, 2016. (PCT/ISA/220, PCT/ISA/237 & PCT/ISA/210).

*Primary Examiner* — Ricky Ngon
(74) *Attorney, Agent, or Firm* — Sughrue Mion, PLLC

(57) ABSTRACT

Various examples of the present invention provide a server for providing information of an electronic device, and the server can comprise: a communication unit for receiving, from at least one first electronic device, at least one piece of information of the first electronic device; and a control unit for determining, from the received information, a current state among a plurality of states preset for the first electronic device, and controlling the first electronic device such that state prediction information of the first electronic device is transmitted to a second electronic device if the determined current state satisfies a preset notification condition on a state diagram in which a relationship among the plurality of states is set. Additionally, other examples could be possible besides the various examples of the present invention.

14 Claims, 12 Drawing Sheets

(51) Int. Cl.
*H04L 12/24* (2006.01)
*G06F 11/22* (2006.01)
*H04L 12/28* (2006.01)

(52) U.S. Cl.
CPC ........ *G06K 9/6297* (2013.01); *H04L 12/2803* (2013.01); *H04L 41/064* (2013.01); *H04L 41/065* (2013.01); *H04L 41/0622* (2013.01); *H04L 41/0636* (2013.01); *H04L 41/085* (2013.01); *H04L 41/0866* (2013.01); *G05B 2219/1196* (2013.01); *G05B 2219/25428* (2013.01); *G05B 2219/31211* (2013.01); *G05B 2219/34012* (2013.01)

(58) Field of Classification Search
USPC ........................................................ 702/183
See application file for complete search history.

(56) References Cited

U.S. PATENT DOCUMENTS

| | | | |
|---|---|---|---|
| 6,957,045 | B2 | 10/2005 | Haller et al. |
| 8,761,911 | B1 * | 6/2014 | Chapman ................ E21B 44/00 700/83 |
| 2006/0251114 | A1 | 11/2006 | Nuggehalli et al. |
| 2011/0208803 | A1 | 8/2011 | McCoy et al. |
| 2012/0310383 | A1 | 12/2012 | Karaffa et al. |
| 2014/0129002 | A1 | 5/2014 | Brandes et al. |
| 2015/0295784 | A1 * | 10/2015 | Kim ................... H04L 41/0853 709/223 |

\* cited by examiner

SERVER, ELECTRONIC DEVICE, AND ELECTRONIC DEVICE INFORMATION PROVIDING METHOD

CROSS-REFERENCE TO RELATED APPLICATION(S)

The present application claims priority under 35 U.S.C. § 365 to International Patent Application No. PCT/KR2016/003128 filed on Mar. 28, 2016, entitled "SERVER, ELECTRONIC DEVICE, AND ELECTRONIC DEVICE INFORMATION PROVIDING METHOD", which claimed the benefit of Korean Patent Application No. 10-2015-0049160 filed on Apr. 7, 2015, each of which are incorporated herein by reference into the present disclosure as if fully set forth herein.

FIELD OF THE INVENTION

Various embodiments of the present disclosure relate to a server, an electronic device, and a method for providing information in an electronic device.

DESCRIPTION OF THE RELATED ART

Generally, electronic devices refer to devices that perform particular functions based on embedded programs, such as home appliances, electronic notes, portable multimedia players (PMPs), and mobile communication terminals, tablet personal computers (PCs), video/audio devices, desktop/laptop computers, vehicle navigation systems, and so forth. For example, these electronic devices may output stored information in the form of sound, images, and so forth. With the increasing integration of electronic devices and the common use of ultra-high-speed and large-volume wireless communication, various functions have been recently provided through a single mobile communication terminal.

For example, an entertainment function such as games, a multimedia function such as music/video playback, a communication and security function for mobile banking, and a function such as schedule management, electronic wallets, or the like, as well as a communication function have been integrated into a single electronic device.

In addition, the electronic device may be provided with various services from another electronic device or a server through a communication function.

As the number of peripheral Internet of Things (IoT) devices of a user increases, the number of tasks which the user needs to manage for each IoT device may also increase. For example, upon occurrence of a particular event in each IoT device, the event has to be notified to an electronic device of the user to allow the user to take an action on the event.

However, if only a result is notified to the user after a problem occurs in various IoT devices, the user may only take a post action on the problem, such that the action may not be proper and the user may feel inconvenience.

Various embodiments of the present disclosure provide a server, an electronic device, and a method for providing information in an electronic device, in which various problematic situations of various peripheral IoT devices managed by the electronic device are notified to a user in advance before occurrence of the situations, thereby preventing various malfunctions or allowing the user to take a prior action.

Various embodiments of the present disclosure provide a server, an electronic device, and a method for providing information in an electronic device, in which information collected from various peripheral IoT devices managed by the electronic device is analyzed and set as a state diagram indicating connection relationships among a plurality of states, and if a current state corresponds to a preset particular state on the state diagram, various problematic situations are notified to the user in advance before the situations occur, thereby preventing various malfunctions or allowing the user to take a prior action.

A server for providing information of an electronic device according to an embodiment to solve the foregoing or other problems includes a communicator configured to receive at least one information of at least one first electronic device from the at least one first electronic device and a controller configured to determine, from the received information, a current state among a plurality of states that are preset for the first electronic device and to transmit state expectation information of the first electronic device to a second electronic device if the determined current state satisfies a preset notification condition on a state diagram in which relationships between the plurality of states are set.

A method for providing information of an electronic device at a server according to any one of various embodiments of the present disclosure includes receiving at least one information of at least one first electronic device from the at least one first electronic device, determining, from the received information, a current state among a plurality of states that are preset for the first electronic device, and transmitting state expectation information of the first electronic device to a second electronic device if the determined current state satisfies a preset notification condition on a state diagram in which relationships between the plurality of states are set.

An electronic device according to any one of various embodiments of the present disclosure includes a communicator configured to receive at least one information of at least one first electronic device from the at least one first electronic device, a storage configured to store information about a plurality of states of the first electronic device, and a controller configured to determine, from the information received through the communicator, a current state among a plurality of states preset for the first electronic device and to output state expectation information of the first electronic device if the determined current state satisfies a preset notification condition on a state diagram in which relationships between the plurality of states are set.

A method for providing information about at least one registered peripheral electronic device in an electronic device according to any one of various embodiments of the present disclosure includes receiving at least one information of at least one first electronic device from the at least one first electronic device, determining, from the received information, a current state among a plurality of states preset for the first electronic device, and outputting state expectation information of the first electronic device if the determined current state satisfies a preset notification condition on a state diagram in which relationships between the plurality of states are set.

With an electronic device and a method for providing information of an electronic device according to various embodiments of the present disclosure, a probable abnormal situation or problem is expected based on information received from various peripheral electronic devices (e.g., IoT devices) registered in the electronic device, and a corresponding notification message is provided, allowing a user to take a proper prior action.

Figure 1:
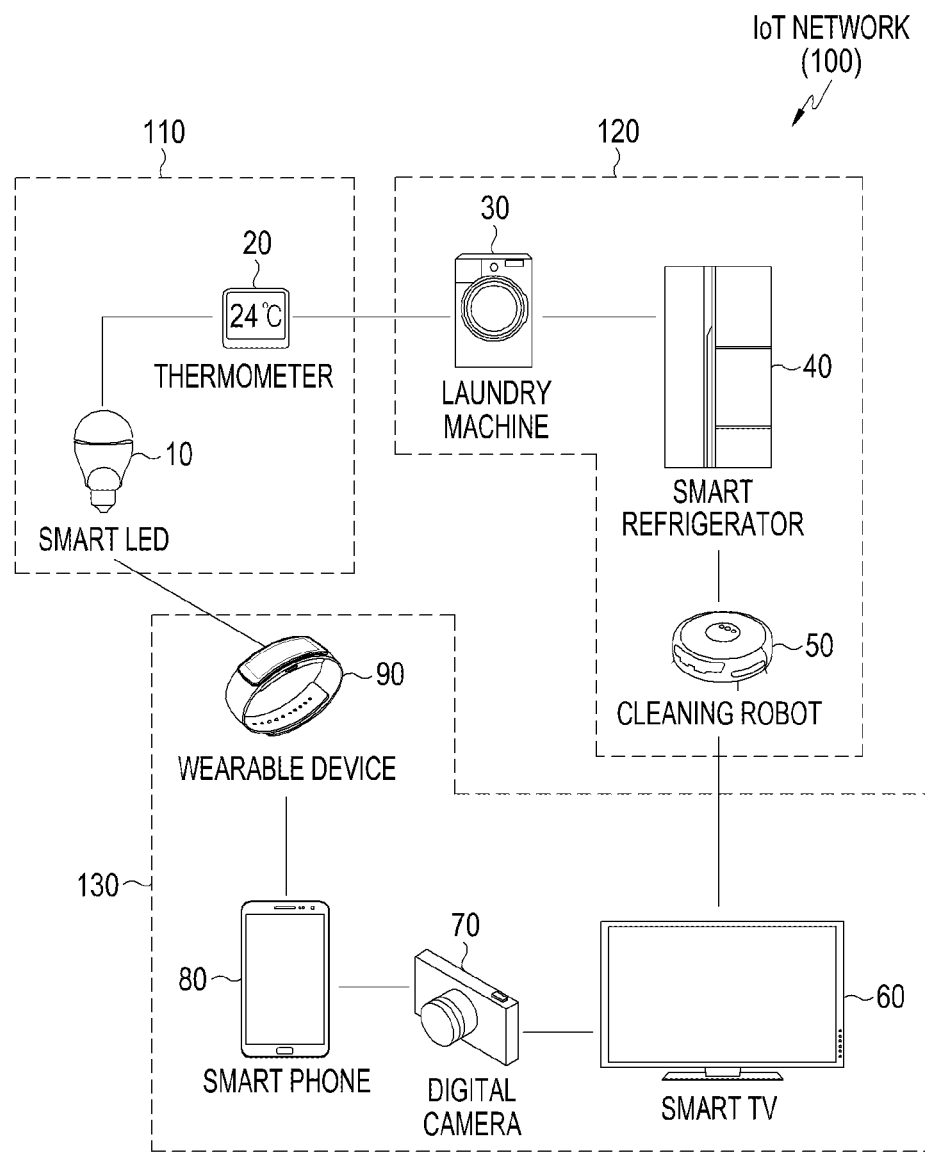
FIG. 1 illustrates an example of an IoT network configuration according to various embodiments of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/ to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of a smartphone, a tablet personal computer (PC), a mobile phone, a video phone, an electronic book (e-book) reader, a desktop PC, a laptop PC, a netbook computer, a workstation server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments, the electronic device may be a smart home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

An electronic device used in various embodiments of the present disclosure to be described below may mean an Internet of Things (IoT) device, or may be an electronic device (e.g., a smart phone) that outputs expected-state information determined from information received from various IoT devices. While an IoT device has been described as an example of peripheral electronic devices that provide various state information, various embodiments of the present disclosure are not limited to the IoT device, and any type of an electronic device capable of transmitting its various state information through wired/wireless communication means may be included in the present disclosure.

Moreover, in various embodiments of the present disclosure, a "state diagram" is information indicating relationships among a plurality of states that are set for each electronic device (e.g., an IoT device), and may include a condition for transition (or switchover) between states. Furthermore, according to various embodiments of the present disclosure, the transition condition between the states may include time information.

In various embodiments of the present disclosure to be described, an "expected state" may mean a state in which transition is expected if a current state on the state diagram satisfies a preset transition condition (e.g., the elapse of a preset time) for each electronic device (e.g., an IoT device). For example, the expected state may include at least one state in which transition is possible in the current state on the state diagram.

More specifically, when a first state and a second state are defined on the state diagram and a transition condition for transition from the first state to the second state is set, if a current state corresponding to information received from the electronic device is the first state, then the second state may be referred to as an expected state.

Moreover, in various embodiments of the present disclosure described below, expected state-related information may be provided in various forms through the electronic device. For example, in various embodiments of the present disclosure, the expected state-related information may be provided in the form of at least one of a text, an image, a moving image, a signal, a sound, and vibration or a combination of at least one of them. According to various embodiments of the present disclosure, the expected state-related information may be provided in the form of a state diagram including a relationship between the current state and the expected state.

Furthermore, in various embodiments of the present disclosure to be described, the expected state-related information may be provided if the current state satisfies a preset 'notification condition'. For example, if an expected state corresponding to the current state on the state diagram is a malfunctioning or abnormal state, this matter may be notified in advance in the current state. Thus, the notification condition may be set to a case where the expected state corresponding to the current state, which is determined from the received information, is a malfunctioning or abnormal state. Moreover, according to various embodiments of the present disclosure, it is determined that the notification condition is satisfied if information received from each electronic device corresponds to a particular state on the state diagram, and information related to the current state, information related to the expected state corresponding to the current state, or state diagram information including a plurality of states and a transition condition may be displayed.

FIG. 1 illustrates an example of an IoT network configuration according to various embodiments of the present disclosure. Today, things communication has expanded its era from the machine-to-machine (M2M) concept of intelligent communication between a human and a thing and between things over a mobile communication network to Internet, rapidly evolving to the concept of interacting with any information in reality and virtuality as well as machines. That is, M2M which enables intelligent communication between a human and a thing and between things in real time in a safe and convenient way anytime and anywhere is expanding its era to IoT by connecting nearby any things over the Internet.

IoT refers to a technology for connecting various machines to Internet by embedding a sensor and a communication function in the machines. Herein, the machines may include various embedded systems (a computer system of an electronic device such as a smart phone) such as a home appliance, a mobile device, a wearable computer, etc. Machines connected to IoT devices may include identifiers (IDs) for identifying themselves. For example, an IoT device may be connected to Internet at a particular Internet Protocol (IP) address, and may include a sensor to obtain information from an external environment.

An example of an IoT-applied network is shown in FIG. 1. FIG. 1 illustrates an IoT network. Referring to FIG. 1, an IoT network 100 may include a smart light emitting diode (LED) 10, a thermometer 20, a laundry machine 30, a smart refrigerator 40, a cleaning robot 50, a smart television (TV) 60, a digital camera 70, a smart phone 80, and a wearable device 90.

Such devices of the IoT network 100 may be classified into small things 110 that have relatively simple unique functions and thus hardware for providing IoT services is also implemented in small sizes, such as the smart LED 10 and the thermometer 20, big things 120 having no display such as the laundry machine 30, the smart refrigerator 40, and the cleaning robot 50, and big things 130 having displays such as the smart TV 60, the digital camera 70, the smart phone 80, and the wearable device 90.

Each device may transmit and receive data (e.g., packet-type data) including sensor data measured through a sensor provided therein or information collected by the device, and thus the information may be collected by a particular device, e.g., the smart phone 80, and provided to a user. The information may also be provided to an external service server to provide a service including the information. For example, an indoor temperature measured by the thermometer 20 may be transmitted to the smart phone 80 and the user may read the indoor temperature to adjust the indoor temperature.

According to various embodiments of the present disclosure, information transmitted from each IoT device (e.g., information of the IoT device) may be transmitted to a server which then analyzes the transmitted information and determines a current state or an expected state of the IoT device. Information related to the current state and/or the expected state determined by the server is transmitted to the smart phone 80, etc., allowing the user to identify the current state and/or the expected state of the IoT device. For example, the user may identify the current state and/or the expected state to take a prior action before abnormality occurs in each IoT device.

Each device of the IoT network 100 may operate as a node, and devices such as the smart TV 60, the digital camera 70, the smart phone 80, the wearable device 90, etc., may be designated as sync nodes collecting information of other node devices.

Although the IoT network including a plurality of IoT devices has been described as an example with reference to FIG. 1, various embodiments of the present disclosure are not limited to an IoT device or an IoT network and any electronic device capable of communication between devices may be included in the present disclosure.

Figure 2:
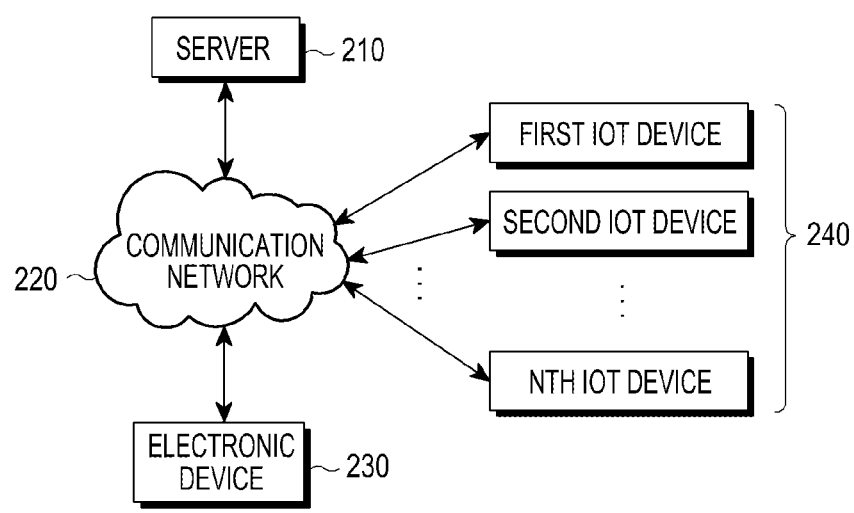
FIG. 2 illustrates an example of a network configuration according to various embodiments of the present disclosure.

FIG. 2 illustrates an example of a network configuration according to various embodiments of the present disclosure. Referring to FIG. 2, a network according to various embodiments of the present disclosure may include a server 210, a communication network 220, an electronic device 230, and at least one IoT device 240. The IoT device 240 is used as an example to help understanding of the present disclosure, and is not limited to an electronic device of a particular type. For example, the IoT device 240 may be any electronic device including a wired or wireless communication function. The IoT device 240 may be referred to as a first electronic device, and the electronic device 230 may be referred to as a second electronic device. The server 210 may be referred to as a knowledge-based intelligent personal assistant (IPA) server, but a server according to embodiments of the present disclosure is not limited to a server having a particular name.

According to various embodiments of the present disclosure, each IoT device 240 transmits at least one information to the server 210, The server 210 identifies information transmitted from each IoT device and determines a state among a plurality of states on a preset state diagram to which a current state corresponds. If there is notification information configured in advance for the determined current state (or the determined current state satisfies a preset notification condition), the server 210 transmits the notification information to the electronic device 230 through the communication network 220. The electronic device 230 outputs notification information received from the server 210 in various forms (e.g., a text, an image, sound, vibration, etc.), thereby notifying the user of a current state and/or an expected state of a corresponding IoT device. According to various embodiments of the present disclosure, the electronic device 230 displays the current state and the expected state of the IoT device in the form of a state diagram.

According to another embodiment of the present disclosure, each IoT device 240 transmits its information (e.g., state-related information) to the electronic device 230. The electronic device 230 identifies information transmitted from each IoT device and determines a state among a plurality of preset states on a state diagram to which a current state corresponds. If there is notification information configured in advance for the determined current state, the electronic device 230 outputs the notification information in various forms (e.g., a text, an image, sound, vibration, etc.), thereby notifying the user of a current state and/or an expected state of a corresponding IoT device.

According to various embodiments of the present disclosure, the server 210 or the electronic device 230 cumulatively stores information received from each IoT device 240 for a predetermined period, analyzes the stored information to define a plurality of states, and sets relationships between the plurality of states to generate a state diagram. Detailed embodiments thereof will be described later.

The communication network 220 provides communication between the server 210, the electronic device 230, or the IoT device 240. For example, the communication network 220 may include at least one of Wireless Fidelity (WiFi), Bluetooth (BT), near field communication (NFC), a global positioning system (GPS), and cellular communication (e.g., Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or a Global System for Mobile Communications (GSM)). The wired communication may include, for example, at least one of a universal serial bus (USB), a high-definition multimedia interface (HDMI), RS-232, and a plain old telephone service (POTS).

According to various embodiments of the present disclosure, the electronic device 230 may receive various information from the IoT device 240.

According to various embodiments of the present disclosure, the IoT device 240 may be any one of a wireless tag, an IoT device, and a beacon transmitter that are capable of providing information through short-range wireless communication.

Hereinafter, referring to FIGS. 3 and 4, a detailed description will be made of information providing procedures in an electronic device according to various embodiments of the present disclosure.

Figure 3:
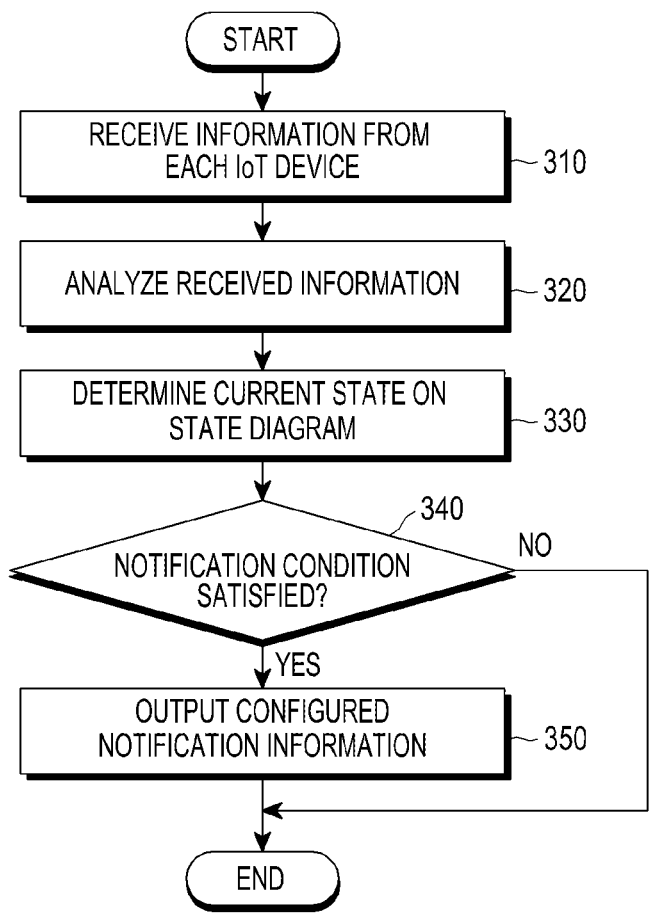
FIG. 3 is a flowchart of an information providing procedure in an electronic device according to various embodiments of the present disclosure.

FIG. 3 is a flowchart of an information providing procedure in an electronic device according to various embodiments of the present disclosure. Referring to FIG. 3, in operation 310, an electronic device receives information (e.g., state-related information) from each IoT device. In operation 320, the electronic device having received the information from the IoT device analyzes the received information. In operation 330, the electronic device determines a state among a plurality of states preset for the particular IoT device to which the current state corresponds, based on the analysis result.

If the determined current state satisfies a preset notification condition or there is notification information to be output corresponding to the determined current state in operation 340, the electronic device outputs configured notification information in various ways in operation 350. For example, the notification information may include information about a current state and/or an expected state and information including the current state and/or the expected state in the form of a state diagram.

At least one of the operations of FIG. 3 may be omitted and at least one other operation may be added between the operations of FIG. 3. In addition, the operations of FIG. 3 may be processed in an illustrated order, and an execution order of at least one operation may be exchanged with that of another operation.

According to various embodiments of the present disclosure, a method for providing information about at least one registered peripheral electronic device in an electronic device includes receiving at least one information of at least one first electronic device from the at least one first electronic device, determining, from the received information, a current state among a plurality of states preset for the first electronic device, and outputting state expectation information of the first electronic device if the determined current state satisfies a preset notification condition on a state diagram in which relationships between the plurality of states are set.

According to various embodiments of the present disclosure, a preset state transition condition may be set between at least two states among the plurality of states on the state diagram.

According to various embodiments of the present disclosure, the transmitted state expectation information may include at least one expected-state information about an expected state to which transition from a current state is expected for the first electronic device and expected time information about an expected time required to make transition to the expected state.

According to various embodiments of the present disclosure, the transmitted state expectation information may include information related to prevention corresponding to abnormality information expected in the first electronic device.

According to various embodiments of the present disclosure, the transmitted state expectation information may include at least one of information related to battery discharging, information related to sound output, information related to light out, information related to a navigator, and information related to transition to a power saving mode.

According to various embodiments of the present disclosure, the setting of the relationships between the plurality of states may be performed by analyzing a life cycle corresponding to a use pattern of a user from the information received from the at least one first electronic device.

Figure 4:
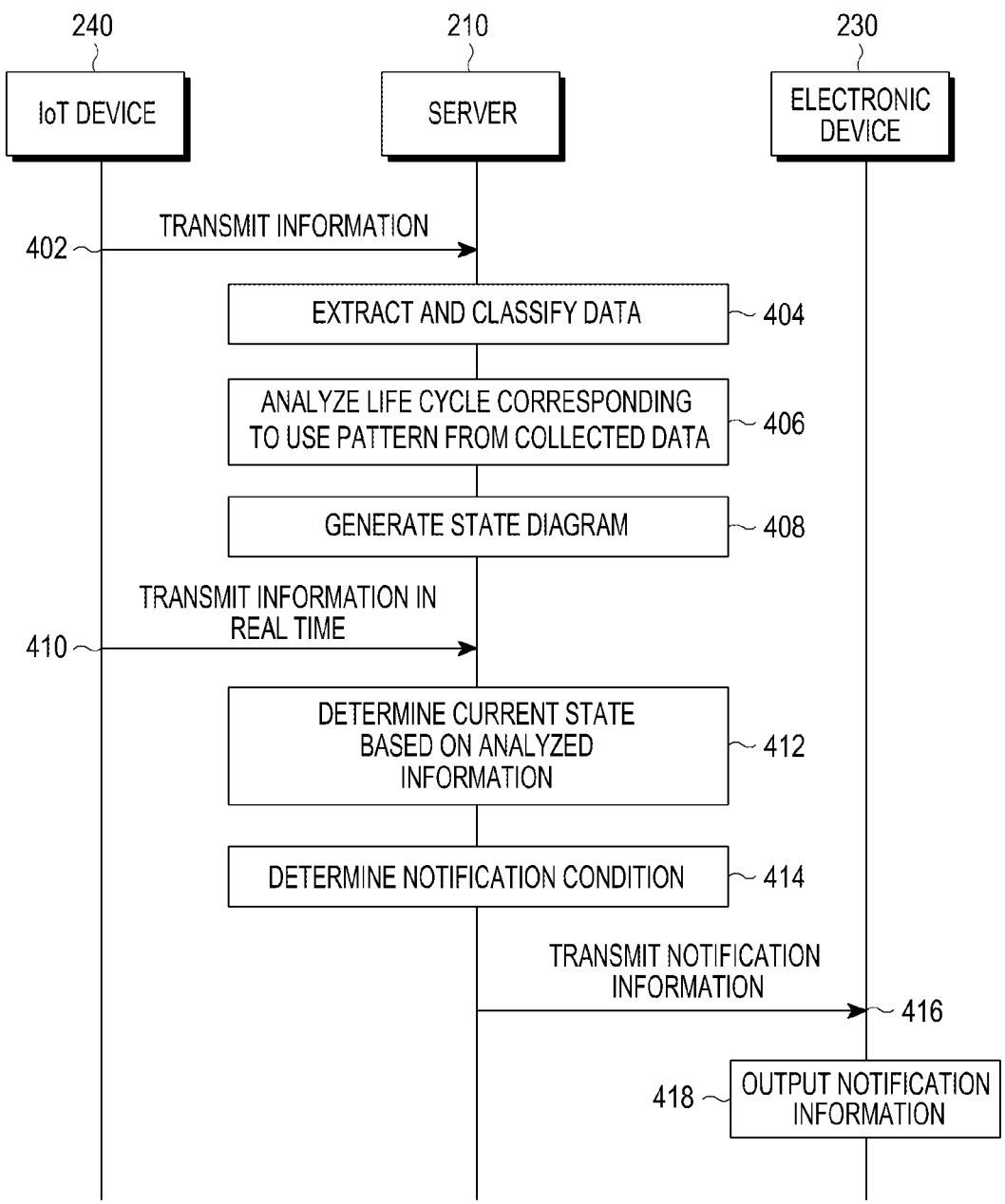
FIG. 4 is a signal flow between devices for providing information according to various embodiments of the present disclosure.

FIG. 4 is a signal flow between devices for providing information according to various embodiments of the present disclosure. Referring to FIG. 4, in operation 402, each IoT device 240 transmits its information (e.g., information related to its state) to the server 210, if a preset condition is satisfied, or periodically.

In operation 404, the server 210 extracts available data from the information transmitted from the IoT device 240 and classifies the extracted data. In operation 406, the server 210 analyzes an IoT device use pattern of a user from the extracted and classified data. For example, the server 210 may analyze a life cycle corresponding to a use pattern for each user. In operation 408, the server 210 generates, based on the analysis result, a state diagram in which relationships among a plurality of states are set for the IoT device 240. For example, according to various embodiments of the present disclosure, if the information received from the IoT device 240 has a particular value, the IoT device 240 may be configured to correspond to one of the plurality of preset states.

In operation 410, the IoT device 240 transmits its state information to the server 210 in real time, if a preset condition is satisfied, or periodically. In operation 412, the server 210 determines the current state by analyzing information transmitted in real time from the IoT device 240. If the current state determined from the information received from the IoT device 240 corresponds to one of a plurality of states included in the generated state diagram, the server 210 determines at least one of the plurality of states to which the current state may make transition as an expected state. For example, the server 210 may determine, based on the received information, a state among the plurality of preset states to which the current state corresponds, and determine whether there is notification information that is configured corresponding to the determined current state. For example, the server 210 determines whether a preset notification condition is satisfied based on the analyzed current state in operation 414, and transmits configured notification information corresponding to the analyzed current state to the electronic device 230 in operation 416.

In operation 418, the electronic device 230 outputs the notification information transmitted from the server 210 using various output means (e.g., a display unit (such as a touch screen), a speaker, a vibration motor, an LED, etc.). As mentioned above, the notification information may include information about a current state and/or an expected state and may be displayed on a screen in the form of a state diagram including a relationship between the current state and the expected state.

At least one of the operations of FIG. 4 may be omitted and at least one other operation may be added between the operations of FIG. 4. In addition, the operations of FIG. 4 may be processed in an illustrated order, and an execution order of at least one operation may be exchanged with that of another operation.

According to various embodiments of the present disclosure, a method for providing information of an electronic device at a server includes receiving at least one information of at least one first electronic device from the at least one first electronic device, determining, from the received information, a current state among a plurality of states that are preset for the first electronic device, and transmitting state expectation information of the first electronic device to a second electronic device if the determined current state satisfies a preset notification condition on a state diagram in which relationships between the plurality of states are set.

According to various embodiments of the present disclosure, a preset state transition condition may be set between at least two states among the plurality of states on the state diagram.

According to various embodiments of the present disclosure, the state expectation information transmitted to the second electronic device may include at least one expected-state information about an expected state to which transition from a current state is expected for the first electronic device and expected time information about an expected time required to make transition to the expected state.

According to various embodiments of the present disclosure, the state expectation information transmitted to the second electronic device may include information related to prevention corresponding to abnormality information expected in the first electronic device.

According to various embodiments of the present disclosure, the state expectation information transmitted to the second electronic device may include at least one of information related to battery discharging, information related to sound output, information related to light out, information related to a navigator, and information related to transition to a power saving mode.

According to various embodiments of the present disclosure, the setting of the relationships between the plurality of states may be performed by analyzing a life cycle corresponding to a use pattern of a user from the information received from the at least one first electronic device.

Hereinbelow, a detailed description will be made of an example of a detailed structure of the server or the electronic device with reference to FIG. 5.

Figure 5:
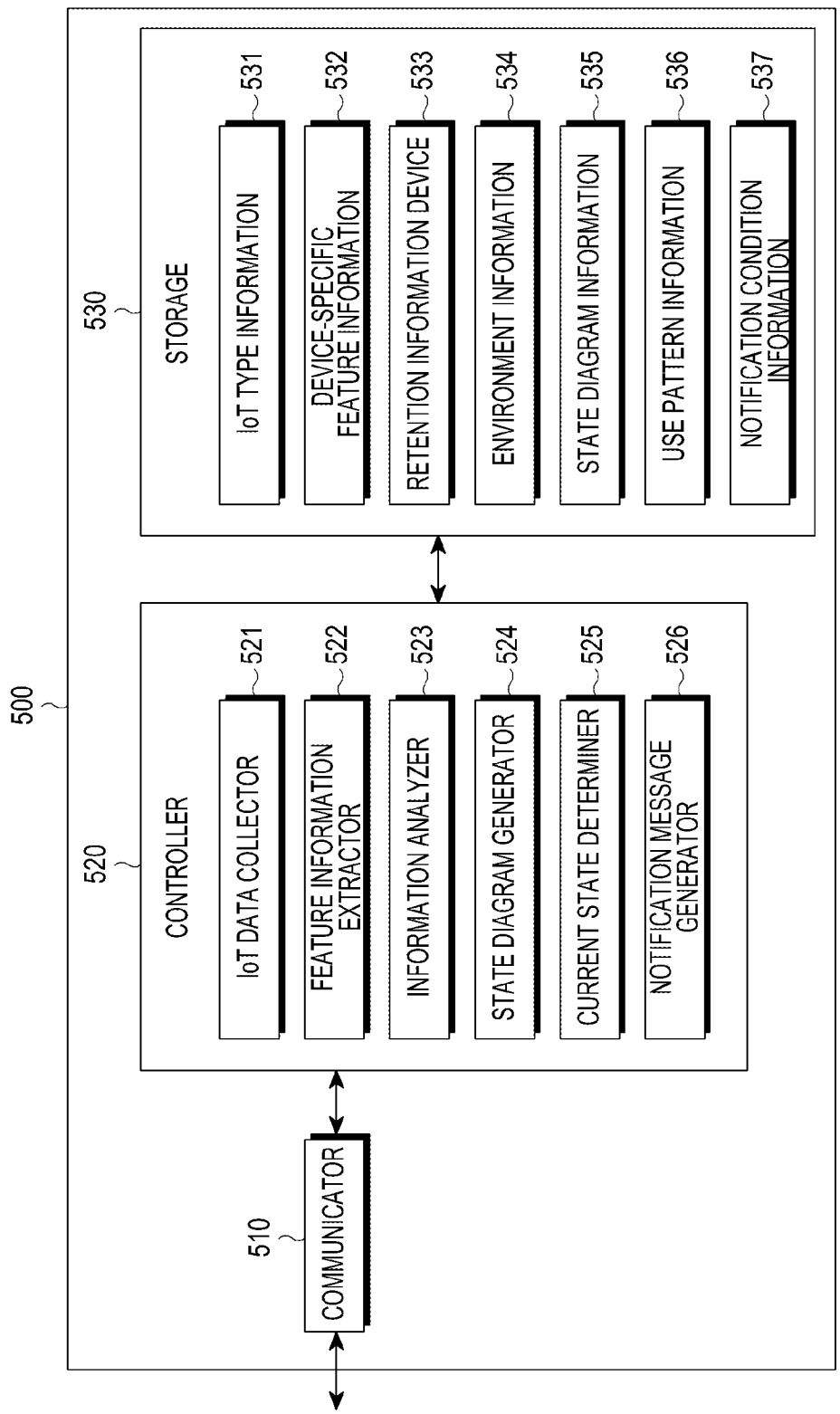
FIG. 5 is a block diagram of an example of a detailed structure of a server or an electronic device according to various embodiments of the present disclosure

FIG. 5 is a block diagram of an example of a detailed structure of a server or an electronic device according to various embodiments of the present disclosure. In the following description, the example shown in FIG. 5 is an electronic device, and according to various embodiments of the present disclosure, at least one of functional units shown in FIG. 5 may be implemented as being included in a server.

Referring to FIG. 5, an electronic device 500 according to various embodiments of the present disclosure may include a communicator 510, a controller 520, and a storage 530. The controller 520 may include at least one of an IoT data collector 521, a feature information extractor 522, an information analyzer 523, a state diagram generator 524, a current state determiner 525, and a notification message generator 526. The storage 530 may include at least one of IoT type information 531, device-specific feature information 532, retention device information 533, environment information 534, state diagram information 535, use pattern information 536, and notification condition information 537.

The communicator 510 receives information from at least one IoT device. The IoT data collector 521 of the controller 520 collects information from each IoT device, received through the communicator 510. Collection of information from each IoT device may be performed by requesting and collecting the information from an IoT device connected to or registered in the electronic device 500 or by collecting the information from each IoT device periodically. If a preset particular condition is satisfied, each IoT device may transmit information related to the current state to the electronic device 500.

The feature information extractor 522 extracts feature information from the information collected by the IoT data collector 521. For example, the information received from the IoT device may include various types of signals or data from which information used for determining the current state may be extracted as feature information. By analyzing the received various types of signals of data, information corresponding to a particular state of the IoT device may be extracted as feature information.

The information analyzer 523 analyzes the feature information extracted by the feature information extractor 522 to analyze a use pattern of the IoT device. According to various embodiments of the present disclosure, the use pattern of the IoT device may differ from user to user, such that the use pattern may be analyzed for each user registered for the same IoT device. For example, a life cycle corresponding to the use pattern may be analyzed for each user.

The state diagram generator 524 generates a state diagram including a plurality of states and information about a transition condition between states, by using the life cycle corresponding to the use pattern analyzed by the information analyzer 523. For example, the generated state diagram may have forms illustrated in FIGS. 6 through 9. The state diagram shows a state transition relationship corresponding to the use of each IoT device based on the analyzed use pattern, and the state diagram may further include transition condition information between states (e.g., information about a time needed for state transition determined based on a life cycle). For example, if satisfying a preset transition condition, a current state determined for an arbitrary IoT device may make transition to a next expected state that is set on the state diagram. According to various embodiments of the present disclosure, if at least one expected state connected with the current state corresponds to a malfunctioning state or an abnormal state, an electronic device of a user may notify information related to the expected state or information related to a transition condition to the user in advance before the current state makes transition to the expected state. According to various embodiments of the present disclosure, whether to perform notification in the current state or notification related to the expected state may be preset together with a state diagram.

The current state determiner 525 determines a state among a plurality of states set by the state diagram generator 524 to which information received from an arbitrary IoT device corresponds.

The notification message generator 526 identifies the state determined by the current state determiner 525, and if there is a notification message preset corresponding to the identified state, the notification message generator 526 outputs the notification message through the electronic device 500. The electronic device 500 may further include various output means (e.g., a display unit, a speaker, a vibration motor, an LED, etc.) capable of outputting the notification message as stated above.

The IoT type information 531 stored in the storage 530 may include type information of at least one IoT device registered in advance in the electronic device 500. For example, the IoT type information 531 may include a product name, a device identification number, a type, a manufacturing company, etc., of each IoT device. The device-specific feature information 532 may include information such as a lifespan, a specification, a capacity, a replacement cycle, etc., of a device.

Figure 11:
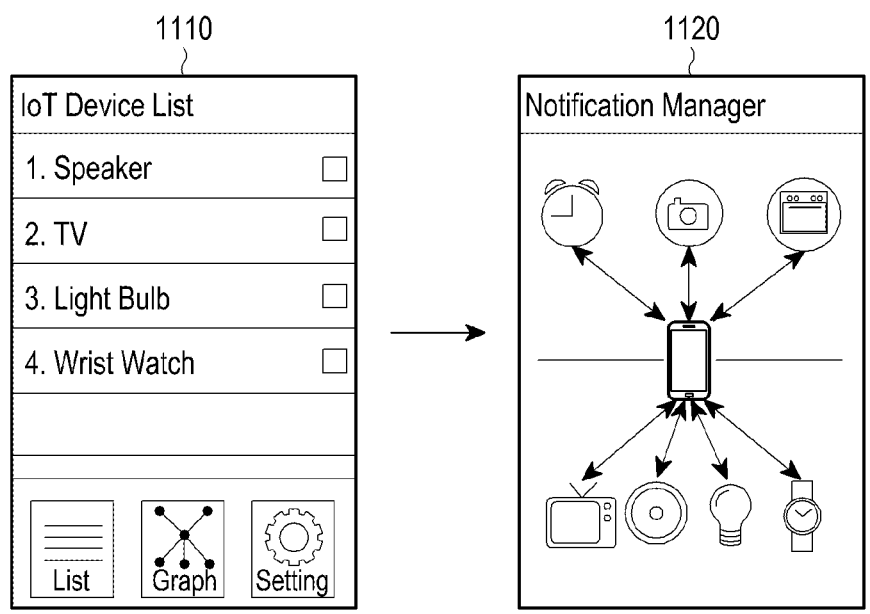
FIG. 11 shows a list of registered IoT devices according to various embodiments of the present disclosure.

The retention device information 533 may include information about an IoT device registered by a particular user. For example, the retention device information 533 may be displayed on a screen in the form of a list as shown in FIG. 11. The environment information 534 may include various environment information of a place where each IoT device is used.

The state diagram information 535 may include at least one states and information related to transition between states, which are generated by the state diagram generator 524. For example, the state diagram information 535 may include information in the forms illustrated in FIGS. 6 through 9.

The use pattern information 536 may include use pattern information of each user for an IoT device, analyzed by the information analyzer 523. The notification condition information 537 may include notification information that is preset corresponding to each state. The notification information may be provided on a screen of an electronic device in forms shown in FIGS. 9 through 15.

While the electronic device is illustrated as independently operating in itself in FIG. 5, the electronic device may be implemented to perform at least some of functions according to various embodiments of the present disclosure by communicating with an external electronic device or a server through the communicator. For example, according to various embodiments of the present disclosure, the server may support driving of the electronic device by performing at least one of operations (or functions) implemented in the electronic device. Thus, the server may include at least some of elements of the controller 520 implemented in the electronic device and may perform (or substitute for) at least one of operations (or functions) performed by the controller 520.

Meanwhile, in various embodiments of the present disclosure, each functional unit or module may mean a functional and structural combination of hardware for performing the technical spirit of various embodiments of the present disclosure and software for driving the hardware. For example, it may be easily construed by those of ordinary skill in the art that each functional unit or module may mean a logical unit of a predetermined code and a hardware resource for executing the predetermined code, and does not necessarily mean a physically connected code or one type of hardware.

According to various embodiments of the present disclosure, an electronic device includes a communicator configured to receive at least one information of at least one first electronic device from the at least one first electronic device, a storage configured to store information about a plurality of states of the first electronic device, and a controller configured to determine, from the information received through the communicator, a current state among a plurality of states preset for the first electronic device and to output state expectation information of the first electronic device if the determined current state satisfies a preset notification condition on a state diagram in which relationships between the plurality of states are set.

According to various embodiments of the present disclosure, a preset state transition condition may be set between at least two states among the plurality of states on the state diagram.

According to various embodiments of the present disclosure, the transmitted state expectation information may include at least one expected-state information about an expected state to which transition from a current state is expected for the first electronic device and expected time information about an expected time required to make transition to the expected state.

According to various embodiments of the present disclosure, the transmitted state expectation information may include information related to prevention corresponding to abnormality information expected in the first electronic device.

According to various embodiments of the present disclosure, the transmitted state expectation information may include at least one of information related to battery discharging, information related to sound output, information related to light out, information related to a navigator, and information related to transition to a power saving mode.

According to various embodiments of the present disclosure, the setting of the relationships between the plurality of states may be performed by analyzing a life cycle corresponding to a use pattern of a user from the information received from the at least one first electronic device.

According to various embodiments of the present disclosure, a server for providing information of an electronic device includes a communicator configured to receive at least one information of at least one first electronic device from the at least one first electronic device and a controller configured to determine, from the received information, a current state among a plurality of states that are preset for the first electronic device and to transmit state expectation information of the first electronic device to a second electronic device if the determined current state satisfies a preset notification condition on a state diagram in which relationships between the plurality of states are set.

According to various embodiments of the present disclosure, a preset state transition condition may be set between at least two states among the plurality of states on the state diagram.

According to various embodiments of the present disclosure, the state expectation information transmitted to the second electronic device may include at least one expected-state information about an expected state to which transition from a current state is expected for the first electronic device and expected time information about an expected time required to make transition to the expected state.

According to various embodiments of the present disclosure, the state expectation information transmitted to the second electronic device may include information related to prevention corresponding to abnormality information expected in the first electronic device.

According to various embodiments of the present disclosure, the state expectation information transmitted to the second electronic device may include at least one of information related to battery discharging, information related to sound output, information related to light out, information related to a navigator, and information related to transition to a power saving mode.

According to various embodiments of the present disclosure, the setting of the relationships between the plurality of states may be performed by analyzing a life cycle corresponding to a use pattern of a user from the information received from the at least one first electronic device.

Hereinbelow, a description will be made of a state where a state diagram for expected states according to various embodiments of the present disclosure is displayed on a screen.

Figure 6:
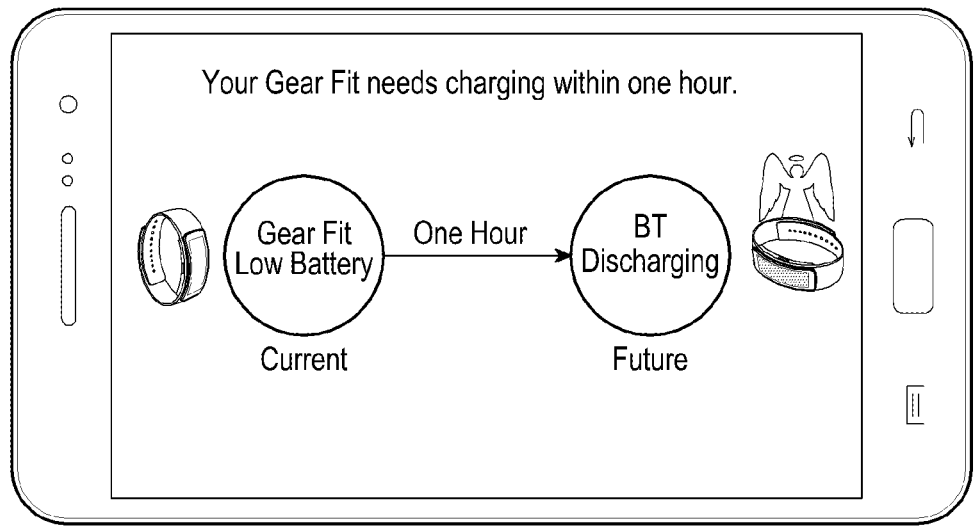
FIG. 6 is a state diagram that is set for a wearable device according to various embodiments of the present disclosure.

FIG. 6 is a state diagram that is set for a wearable device according to various embodiments of the present disclosure. Referring to FIG. 6, information received from a wearable device may include information about a battery. If a battery state of the wearable device is a preset level (e.g., a remaining capacity of 10%), a current state may be determined as a "Gear Fit Low Battery" state. The current state may correspond to one of a plurality of preset states determined by analysis of a life cycle corresponding to a use pattern. For example, according to the state diagram displayed on the screen in FIG. 6, an expected state corresponding to the current state is a state in which an IoT device (e.g., the wearable device) is expected to be discharged after one hour. That is, if one hour elapses during which the wearable device is continuously used in the current state, transition to a "BT Discharged" state may be expected.

Thus, in the state, a notification message indicating that discharging is expected after one hour may be provided through the electronic device. In addition, according to various embodiments of the present disclosure, as shown in FIG. 6, the current state (e.g., Gear Fit Low Battery), the expected state (e.g., BT Discharged), a condition for transition from the current state to the expected state (e.g., the elapse of one hour), etc., may be displayed on a screen in the form of a state diagram.

According to various embodiments of the present disclosure, determination of the state and the transition condition from the current state to the expected state may be generated as a result of analysis of a life cycle corresponding to a use pattern based on information collected from each IoT device as described above.

Figure 7:
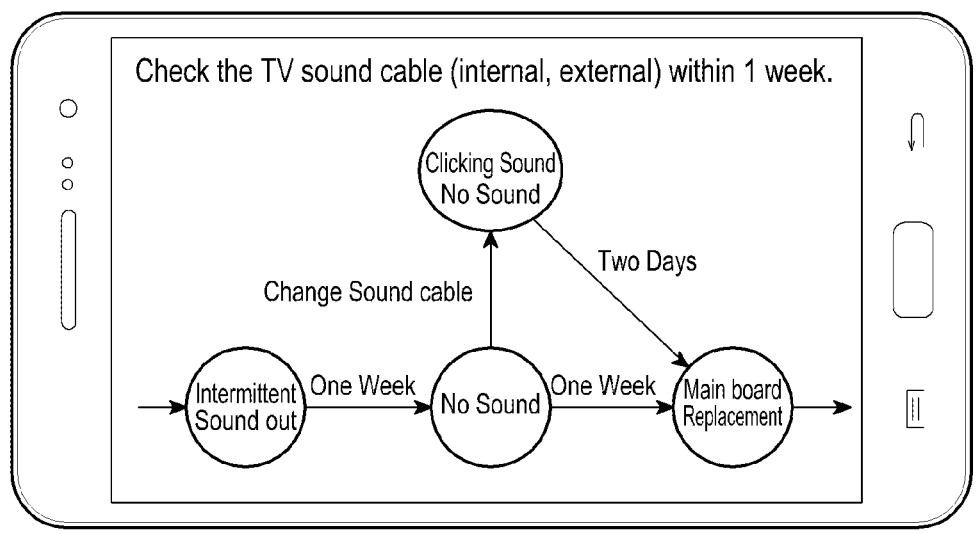
FIG. 7 is a state diagram that is set for a TV according to various embodiments of the present disclosure.

FIG. 7 is a state diagram that is set for a TV according to various embodiments of the present disclosure. Referring to FIG. 7, a state diagram including a current state, an expected state, and transition information between states as shown in FIG. 7 may be displayed on a screen by analyzing information collected from a TV.

For example, if it is determined as a result of analysis of the information received from the TV that there is no sound intermittently, the current state is determined as a "Intermittent Sound Out" state among a plurality of preset states. Based on a state diagram determined based on analysis of a life cycle corresponding to a use pattern, it may be expected that the current state may make transition to a "No Sound" state where no sound is output after one week.

If one week elapses from the expected state "No Sound", then the state may be such that a main board needs to be replaced. After a sound cable is replaced in the expected state "No Sound", if the state makes transition to an expected state where noise is output, then an expected state may be such that the main board needs to be replaced after two days.

According to various embodiments of the present disclosure, the current state is determined as a particular state on the state diagram based on the information received from the TV, and a preset notification message is output through the electronic device based on a preset transition condition in the determined current state.

According to various embodiments of the present disclosure, determination of the state and the transition condition between states may be generated as a result of analysis of a life cycle corresponding to a use pattern based on information collected from each IoT device as described above.

Figure 8:
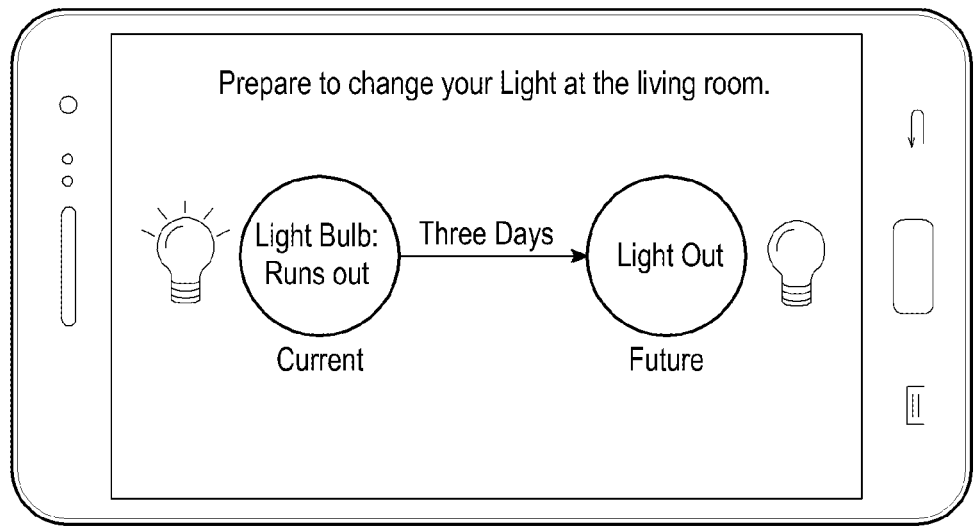
FIG. 8 is a state diagram that is set for an illumination device according to various embodiments of the present disclosure.

FIG. 8 is a state diagram that is set for an illumination device according to various embodiments of the present disclosure. Referring to FIG. 8, by analyzing information collected from an illumination device (e.g., a light bulb, an LED, a fluorescent light, etc.), a state diagram including transition information between states as shown in FIG. 8 may be displayed on a screen.

For example, if the current state is determined in which the light bulb runs out, as a result of analysis of the information received from the illumination device, then the current state corresponds to a "Light Bulb: Runs Out" state, among a plurality of preset states, and may be expected to make transition to a "Light Out" state where the illumination device is not turned on at all after three weeks, based on analysis of a life cycle corresponding to a use pattern.

According to various embodiments of the present disclosure, the current state is determined as a particular state on the state diagram based on the information received from the illumination device, and a preset notification message is output through the electronic device based on a condition for future transition from the current state.

According to various embodiments of the present disclosure, determination of the state and the transition condition between states may be generated as a result of analysis of a life cycle corresponding to a use pattern based on information collected from each IoT device as described above.

Figure 9:
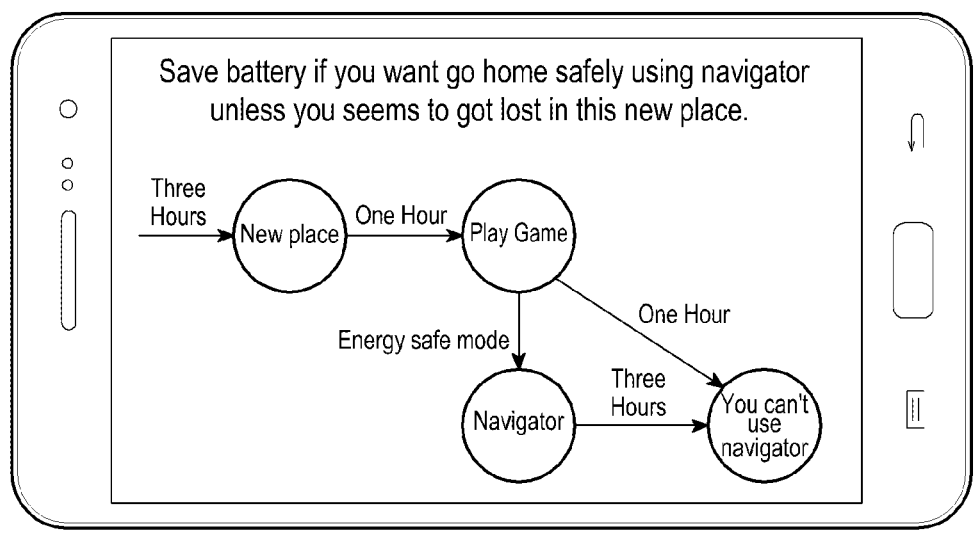
FIG. 9 is a state diagram that is set for a smart phone according to various embodiments of the present disclosure.

FIG. 9 is a state diagram that is set for a smart phone according to various embodiments of the present disclosure. Referring to FIG. 9, a state diagram including transition information between states as shown in FIG. 9 may be displayed on a screen by analyzing information collected from a smart phone. According to various embodiments of the present disclosure, an electronic device may analyze information collected from the smart phone and output a notification message, or the smart phone as an electronic device may analyze its information and output a notification message.

For example, if it is determined from GPS information of the electronic device that the user moves to a new place during three hours, then the current state may be determined as a "New Place" state among a plurality of states included in a preset state diagram. In the "New Place" state, a state is expected where the user may use a navigator for the next three hours to go back home.

For example, if the user plays game after one hour from the expected state, a state is expected where the user may not be able to use the navigator after one hour. Thus, in a "Play Game" state, transition to an energy-saving mode is performed to enable the user to use the navigator for three hours.

According to various embodiments of the present disclosure, the current state is determined as a particular state on the state diagram based on the information received from the smart phone, and a preset notification message is output through the electronic device based on a condition for future transition from the current state, or setting of the electronic device (e.g., the energy-saving mode, etc.) may be forcedly changed.

According to various embodiments of the present disclosure, determination of the current state and the transition condition between states may be generated as a result of analysis of a life cycle corresponding to a use pattern based on information collected from each IoT device as described above.

Hereinafter, a description will be made of various examples where a notification message is output through an electronic device according to an expected state and satisfaction with a notification condition with reference to FIGS. 10 through 15.

Figure 10:
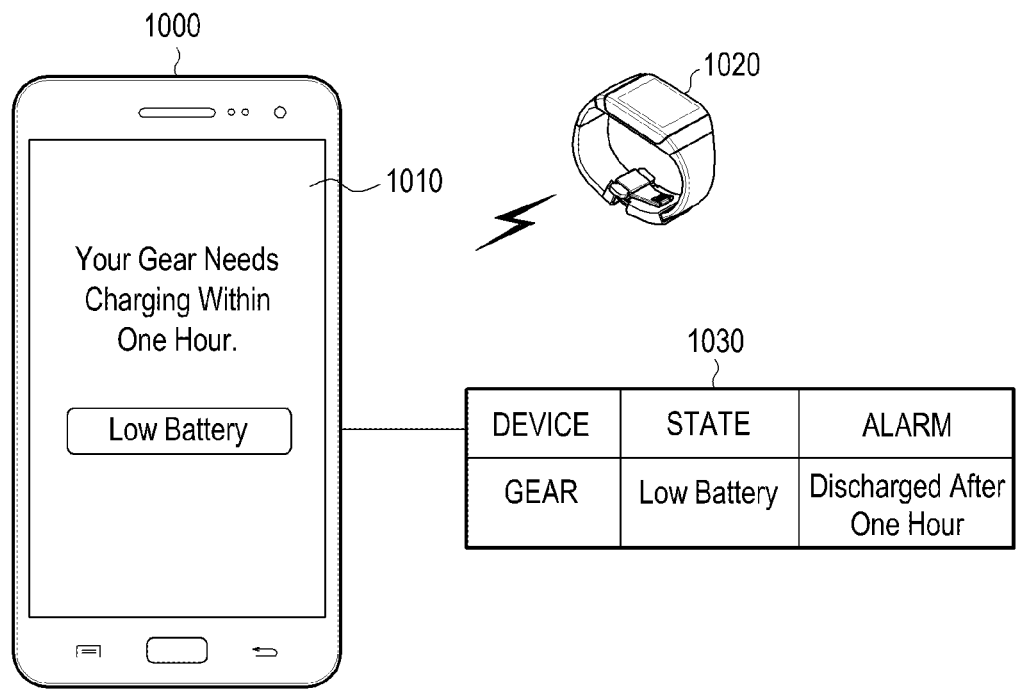
FIG. 10 shows notification information corresponding to an expected state of a wearable device according to various embodiments of the present disclosure.

FIG. 10 shows notification information corresponding to an expected state of a wearable device according to various embodiments of the present disclosure. Referring to FIG. 10, as a result of analysis of information collected from a wearable device 1020, a current state of the wearable device 1020 may be determined from a table 1030 corresponding to a state diagram. For example, it can be seen from the table 1030 that, if the state of the wearable device 1020 is "Low Battery", the expected state corresponds to a "Discharged after One Hour" state in the state diagram. In addition, according to various embodiments of the present disclosure, if a notification message is set to be output for the current state, then an electronic device 1000 may output a message related to the expected state, such as "Your Gear Needs Charging Within One Hour", through a display unit 1010.

FIG. 11 shows a list of registered IoT devices according to various embodiments of the present disclosure. Referring to FIG. 11, the user registers and manages at least one IoT devices in an electronic device 1110.

The at least one IoT devices registered in the electronic device 1110 may be displayed on a screen in the form of a list as shown in FIG. 11, and the user may set activation of each IoT device on the list. For example, if a particular IoT device is activated on the list, a notification message corresponding to a current state analyzed from information received from the IoT device may be output. However, even if a particular IoT device is registered, a notification message may not be output when the IoT device is deactivated.

The list of IoT devices may be displayed in the form of an image, like a screen 1120 shown in the right side of FIG. 11.

Figure 12:
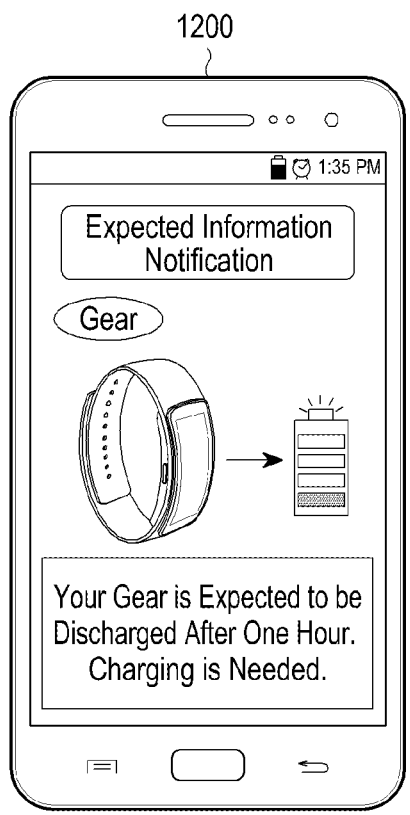
FIG. 12 shows notification information corresponding to an expected state of a wearable device according to various embodiments of the present disclosure.

FIG. 12 shows notification information corresponding to an expected state of a wearable device according to various embodiments of the present disclosure. Referring to FIG. 12, if a registered IoT device is a wearable device, battery information may be received from the wearable device. If the received battery information of the wearable device corresponds to a particular state among a plurality of states included in a preset state diagram and notification information is configured in relation to an expected state corresponding to the current state, then notification information regarding the expected state may be displayed on a screen of an electronic device 1200 as shown in FIG. 12. For example, a notification message such as "Your Gear is Expected to be Discharged After One Hour. Charging is Needed." may be output.

Figure 13:
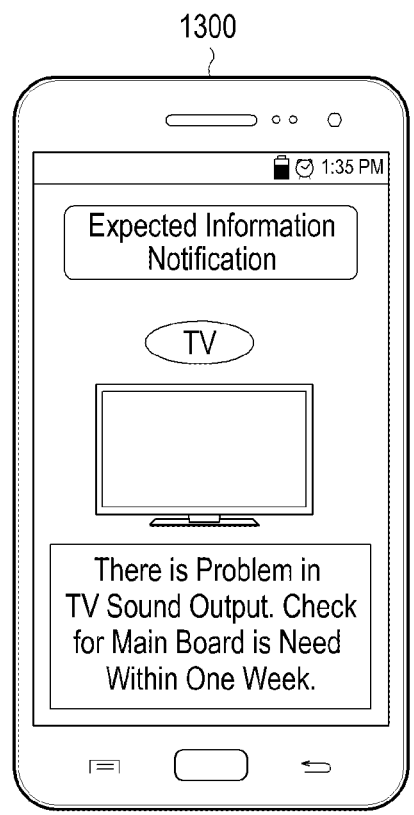
FIG. 13 shows notification information corresponding to an expected state of a TV according to various embodiments of the present disclosure.

FIG. 13 shows an expected information notification screen configured corresponding to a current state of a TV according to various embodiments of the present disclosure. Referring to FIG. 13, if a registered IoT device is a TV, information related to sound output may be received from the TV. If the received sound output information of the TV corresponds to a particular state among a plurality of states included in a preset state diagram and notification information is configured in relation to an expected state corresponding to the current state, then notification information regarding the expected state may be displayed on a screen of an electronic device 1300 as shown in FIG. 13. For example, a notification message such as "Problem Occurs in TV Sound Output. Check for Main Board is Needed Within One Week" may be output.

Figure 14:
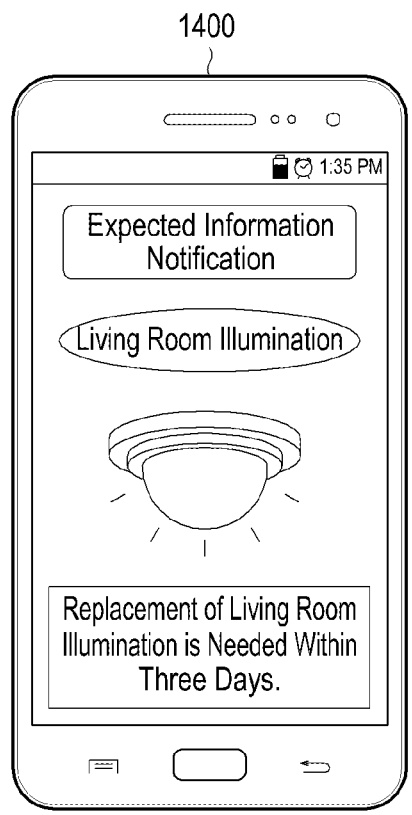
FIG. 14 shows notification information corresponding to an expected state of an illumination device according to various embodiments of the present disclosure.

FIG. 14 shows an expected information notification screen corresponding to a current state of an illumination device according to various embodiments of the present disclosure. Referring to FIG. 14, if a registered IoT device is an illumination device of a living room, illumination-related information may be received from the illumination device. If the received illumination-related device corresponds to a particular state among a plurality of states included in a preset state diagram and notification information is configured in relation to an expected state corresponding to the current state, then notification information regarding the expected state may be displayed on a screen of an electronic device 1400 as shown in FIG. 14. For example, a notification message such as "Replacement of Living Room Illumination is Needed Within Three Days." may be output.

Figure 15:
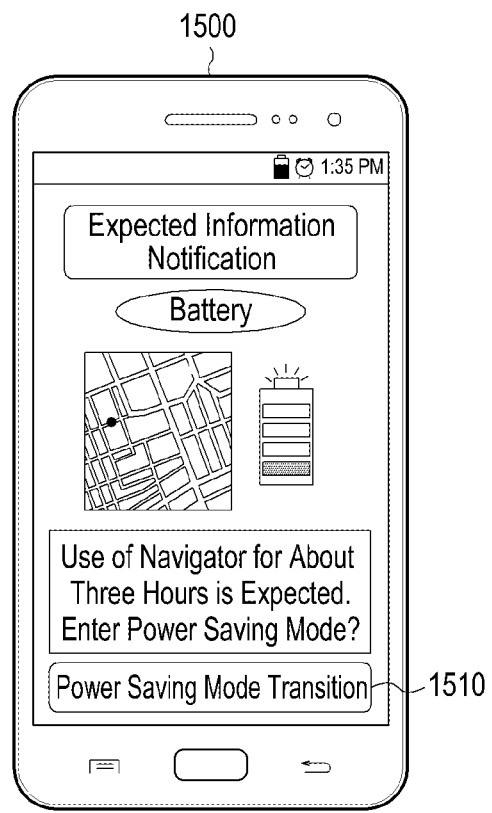
FIG. 15 shows notification information corresponding to an expected state of an electronic device according to various embodiments of the present disclosure.

FIG. 15 shows an expected information notification screen corresponding to a current state of an electronic device according to various embodiments of the present disclosure. Referring to FIG. 15, if a registered IoT device is an electronic device, movement information of the user may be received from the electronic device or the electronic device may determine the user's movement information in itself. If the information received from the electronic device corresponds to a particular state among a plurality of states included in a preset state diagram and notification information is configured in relation to the state, then notification information regarding the expected state may be displayed on a screen of an electronic device 1500 as shown in FIG. 15. For example, a notification message such as "Use of Navigator for About Three Hours is Expected. Enter Power Saving Mode?" may be output. In addition, to make it easy for the user to make transition to the power saving mode, a shortcut button 1510 may be provided. For example, the user may easily make transition of a use mode of the electronic device 1500 to the power saving mode by selecting a power saving mode transition button 1510.

Figure 16:
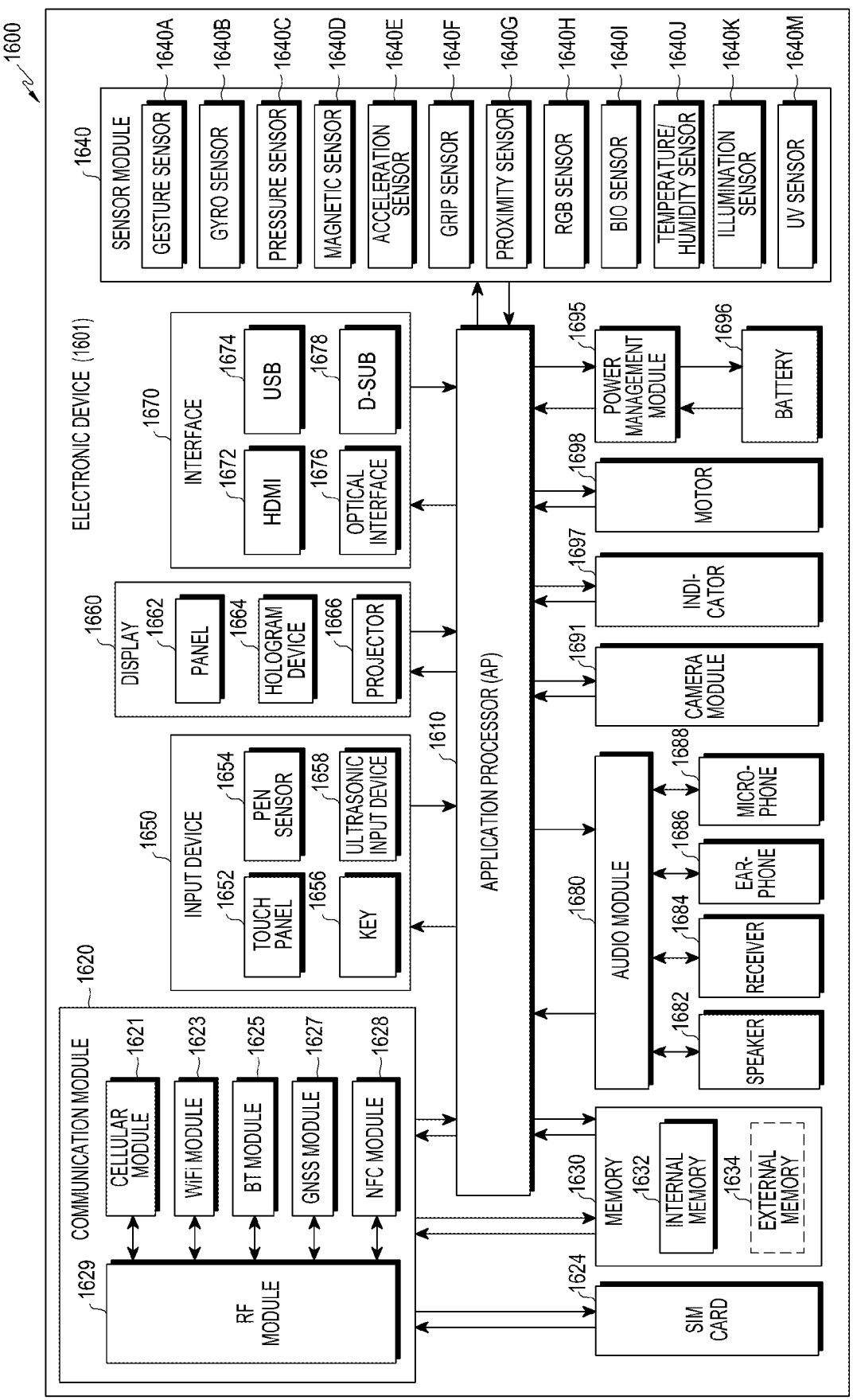
FIG. 16 is a block diagram of a detailed structure of an electronic device according to various embodiments of the present disclosure.

FIG. 16 is a block diagram 1600 of an electronic device 1601 according to various embodiments of the present disclosure. The electronic device 1601 may include the entire electronic device illustrated in FIG. 2 or a part of the electronic device illustrated in FIG. 2. The electronic device 1601 may include one or more application processors (APs) 1610, a communication module 1620, a subscriber identification module (SIM) 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 controls multiple hardware or software components connected to the AP 1610 by driving an operating system (OS) or an application program, and performs processing and operations with respect to various data. The processor 1610 may be implemented with, for example, a system on chip (SoC). According to an embodiment, the server 1610 may further include a GPU and/or an image signal processor. The AP 1610 may include at least some of the elements illustrated in FIG. 16 (e.g., the cellular module 1621). The processor 1610 loads a command or data received from at least one of other elements (e.g., a non-volatile memory) into a volatile memory to process the command or data, and stores various data in the non-volatile memory.

The communication module 1620 may include, for example, the cellular module 1621, a WiFi module 1623, a Bluetooth (BT) module 1625, a GPS module 1627, a near field communication (NFC) module 1628, and a radio frequency (RF) module 1629.

The cellular module 1621 may provide, for example, a voice call, a video call, a text service, or an Internet service over a communication network. According to an embodiment, the cellular module 1621 identifies and authenticates the electronic device 1601 in a communication network by using the SIM (e.g., a SIM card) 1624. According to an embodiment, the cellular module 1621 performs at least some of functions that may be provided by the AP 1610. According to an embodiment, the cellular module 1621 may include a communication processor (CP).

Each of the WiFi module 1623, the BT module 1625, the GPS module 1627, and the NFC module 1628 may include a processor for processing data transmitted and received by a corresponding module. According to some embodiment, at least some (e.g., two or more) of the cellular module 1621, the WiFi module 1623, the BT module 1625, the GPS module 1627, and the NFC module 1628 may be included in one integrated chip (IC) or IC package.

The RF module 1629 may, for example, transmit and receive a communication signal (e.g., an RF signal). The RF module 1629 may include a transceiver, a power amp module (PAM), a frequency filter, a low noise amplifier (LNA), or an antenna. According to another embodiment, at least one of the cellular module 1621, the WiFi module 1623, the BT module 1625, the GPS module 1627, and the NFC module 1628 may transmit and receive an RF signal through the separate RF module 229.

The SIM card 1624 may, for example, include a card including an SIM and/or an embedded SIM, and may include unique identification information (e.g., an integrated circuit card identifier (ICCID) or subscriber information (e.g., an international mobile subscriber identity (IMSI)).

The memory 1630 (e.g., the memory 1630) may, for example, include an internal memory 1632 and/or an external memory 1634. The internal memory 1632 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 1634 may further include flash drive, for example, compact flash (CF), secure digital (SD), micro-SD, mini-SD, extreme Digital (xD), a multi-media card (MMC), or a memory stick. The external memory 1634 may be functionally and/or physically connected with the electronic device 1601 through various interfaces.

The sensor module 1640 measures physical quantity or senses an operation state of the electronic device 1601 to convert the measured or sensed information into an electric signal. The sensor module 1640 may, for example, include at least one of a gesture sensor 1640A, a gyro sensor 1640B, a pressure sensor 1640C, a magnetic sensor 1640D, an acceleration sensor 1640E, a grip sensor 1640F, a proximity sensor 1640G, a color sensor (e.g., RGB sensor) 1640H, a biometric sensor 16401, a temperature/humidity sensor 1640J, an illumination sensor 1640K, and a ultraviolet (UV) sensor 1640M. Additionally or alternatively, the sensor module 1640 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 1640 may further include a control circuit for controlling at least one sensor included therein. In some embodiment, the electronic device 1601 may further include a processor configured to control the sensor module 1640 as part of or separately from the AP 1610, to control the sensor module 1640 during a sleep state of the AP 1610.

The input device 1650 may include, for example, a touch panel 1652, a (digital) pen sensor 1654, a key 1656, or an ultrasonic input device 1658. The touch panel 1652 may use at least one of a capacitive type, a resistive type, an IR type, or an ultrasonic type. The touch panel 1652 may further include a control circuit. The touch panel 1652 may further include a tactile layer to provide tactile reaction to the user.

The (digital) pen sensor 1654 may include a recognition sheet which is a part of the touch panel or a separate recognition sheet. The key 1656 may also include a physical button, an optical key, or a keypad. The ultrasonic input device 1658 senses sound waves through a microphone (e.g., the microphone 1688) of the electronic device 1601 using an input means that generates an ultrasonic signal, thereby checking data.

The display (1660) may include a panel 1662, a hologram device 1664, or a projector 1666. The panel 1662 may be implemented to be flexible, transparent, or wearable. The panel 1662 may be configured with the touch panel 1652 in one module. The hologram device 1664 shows a stereoscopic image in the air by using interference of light. The projector 1666 displays an image through projection of light onto a screen. The screen may be positioned inside or outside the electronic device 1601. According to an embodiment, the display 1660 may further include a control circuit for controlling the panel 1662, the hologram device 1664, or the projector 1666.

According to an embodiment, the interface 1670 may include an HDMI 1672, a USB 1674, an optical interface 1676, or a D-subminiature (D-sub) 1678. Additionally or alternatively, the interface 1670 may include, for example, an MHL interface, an SD card/MMC interface, or an IrDA standard interface.

The audio module 1680 bi-directionally converts sound and an electric signal. The audio module 1680 processes sound information input or output through the speaker 1682, the receiver 1684, the earphone 1686, or the microphone 1688.

The camera module 1691 is a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 1695 manages power of the electronic device 1601. According to an embodiment, the power management module 1695 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 1696 or the voltage, current, or temperature of the battery 1696 during charging. The battery 1696 may include a rechargeable battery or a solar battery.

The indicator 1697 displays a particular state, for example, a booting state, a message state, or a charging state, of the electronic device 1601 or a part thereof (e.g., the AP 1610). The motor 1698 converts an electric signal into mechanical vibration or generates vibration or a haptic effect. Although not shown, the electronic device 1601 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 17:
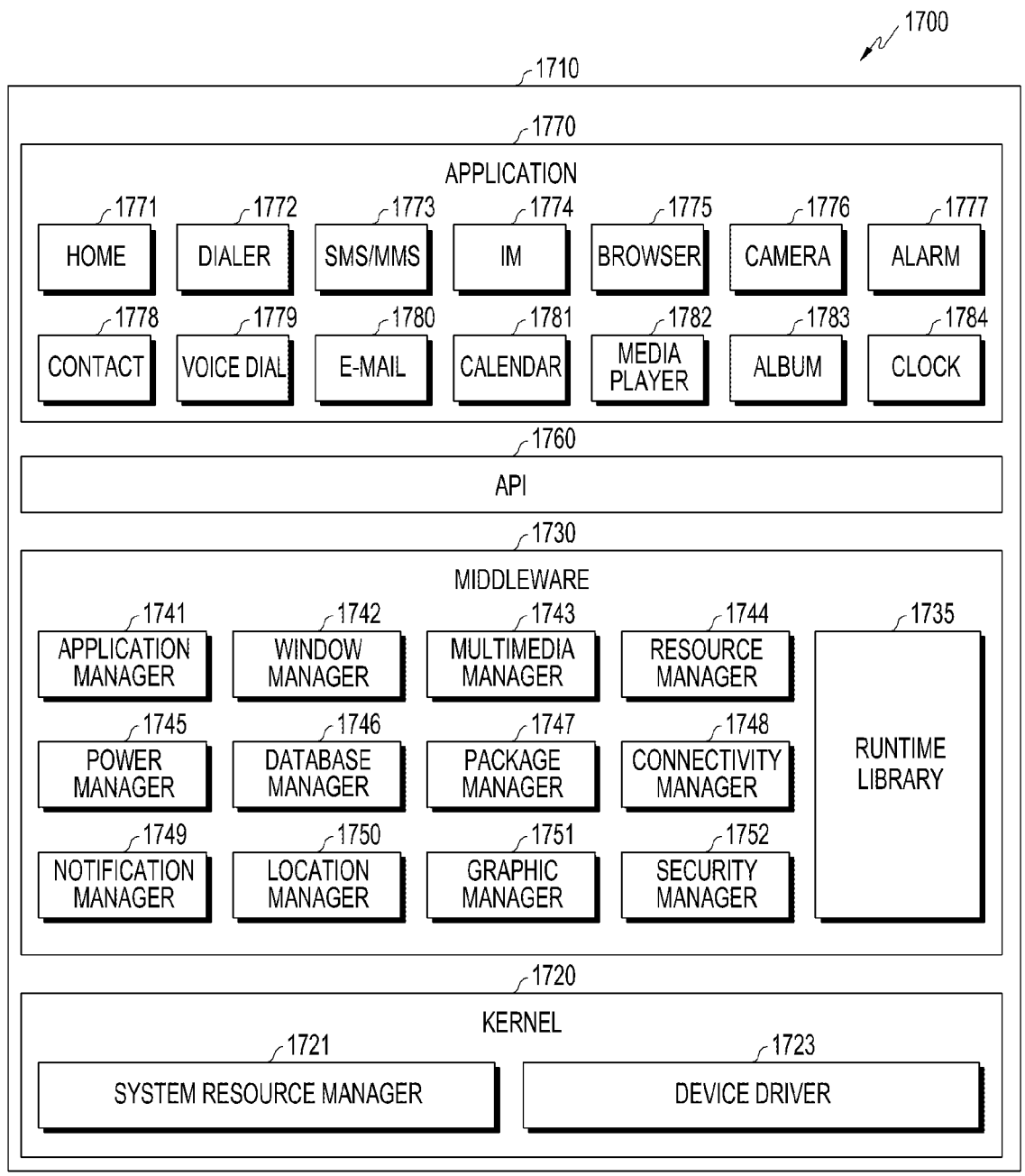
FIG. 17 is a block diagram of a programming module according to various embodiments of the present disclosure.

FIG. 17 is a block diagram 1700 of a programming module 1710 according to various embodiments of the present disclosure. According to an embodiment, the programming module 1710 may include an OS for controlling resources associated with an electronic device (e.g., the electronic device) and/or various applications (e.g., an application program) executed on the OS. The OS may include Android, iOS, Windows, Symbian, Tizen, or Bada.

The programming module 1710 may include, for example, a kernel 1720, middleware 1730, an API 1760, and/or an application 1770. At least a part of the programming module 1710 may be preloaded on an electronic device or may be downloaded from a server.

The kernel 1720 may include a system resource manager 1721 or a device driver 1723. The system resource manager 1721 may perform control, allocation, retrieval of system resources, and so forth. According to an embodiment, the system resource manager 1721 may include a process management unit, a memory management unit, a file system management unit, or the like. The device driver 1723 may include, for example, a display driver, a camera driver, a Bluetooth driver, a shared memory driver, a USB driver, a keypad driver, a WiFi driver, an audio driver, or an inter-process communication (IPC) driver.

The middleware 1730 may provide functions that the application 1770 commonly requires or provide various functions to the application 1770 through the API 1760 to allow the application 1770 to efficiently use a limited system resource in the electronic device. According to an embodiment, the middleware 1730 may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include a library module that a compiler uses to add a new function through a programming language while the application 1770 is executed. The runtime library 1735 performs functions relating to input/output management, memory management, or an arithmetic function.

The application manager 1741 manages a life cycle of at least one application, for example, among the applications 1770. The window manager 1742 manages a GUI resource used in a screen. The multimedia manager 1743 recognizes a format necessary for playing various media files and performs encoding or decoding on a media file by using a codec appropriate for a corresponding format. The resource manager 1744 manages a resource such as a source code, a memory, or a storage space of at least one application among the applications 1770.

The power manager 1745 manages a battery or power, for example, in operation with a basic input/output system (BIOS) and provides power information necessary for an operation of the electronic device. The database manager 1746 generates, searches or changes a database used for at least one application among the applications 1770. The package manager 1747 manages the installation or update of an application distributed in a package file format.

The connectivity manager 1748 manages a wireless connection such as a WiFi or Bluetooth connection. The notification manager 1749 displays or notifies events such as arrival messages, appointments, and proximity alerts in a manner that is not disruptive to a user. The location manager 1750 manages location information of the electronic device. The graphic manager 1751 manages a graphic effect to be provided to the user or a user interface relating thereto. The security manager 1752 provides a general security function necessary for system security, user authentication, etc. According to an embodiment, if the electronic device (e.g., the electronic device of FIG. 8) has a call function, the middleware 1730 may further include a telephony manager for managing a voice or video call function of the electronic device.

The middleware 1730 may include a middleware module forming a combination of various functions of the above-mentioned elements. The middleware 1730 may provide modules specified according to types of an OS so as to provide distinctive functions. Additionally, the middleware 1730 may delete some of existing elements or add new elements dynamically.

The API 1760 may be provided as a set of API programming functions with a different configuration according to the OS. For example, in the case of Android or iOS, for example, one API set may be provided by each platform, and in the case of Tizen, two or more API sets may be provided.

The application 1770 may include one or more applications capable of providing a function, for example, a home application 1771, a dialer application 1772, a short messaging service/multimedia messaging service (SMS/MMS) application 1773, an instant message (IM) application 1774, a browser application 1775, a camera application 1776, an alarm application 1777, a contact application 1778, a voice dial application 1779, an e-mail application 1780, a calendar application 1781, a media player application 1782, an album application 1783, a clock application 1784, a health care application (e.g., an application for measuring an exercise amount, a blood sugar, etc.), or an environment information providing application (e.g., an application for providing air pressure, humidity, temperature information, etc.).

According to an embodiment, the application 1770 may include an application (hereinafter, an "information exchange application" for convenience) supporting information exchange between the electronic device (e.g., the electronic device of FIG. 8) and an external electronic device. The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device. The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display) of an external device communicating with the electronic device, a service (e.g., a call service or a message service) provided by an application operating on the external electronic device or provided by the external electronic device.

According to an embodiment, the application 1770 may include an application (e.g., a health care application) set on the basis of an attribute (e.g., a mobile medical appliance as a type of the electronic device) of the external electronic device. According to an embodiment, the application 1770 may include an application received from the external electronic device. According to an embodiment, the application 1770 may include a preloaded application or a third party application that may be downloaded from the server. Names of elements of the programming module 1710 according to the illustrated embodiment may vary depending on a type of an OS.

According to various embodiments, at least a part of the programming module 1710 may be implemented by software, firmware, hardware, or a combination of at least two of them. The at least a part of the programming module 1710 may be implemented (e.g., executed) by a processor (e.g., the AP 1610). The at least a part of the programming module 1710 may include, for example, modules, programs, routines, sets of instructions, or processes for performing one or more functions.

A term "module" used herein may mean, for example, a unit including one of or a combination of two or more of hardware, software, and firmware. The "module" or "functional unit" may be interchangeably used with a unit, a logic, a logical block, a component, or a circuit. The "module" or "functional unit" may be a minimum unit or a portion of an integrated component. The "module" may be a minimum unit or a portion thereof performing one or more functions. The "module" or "functional unit" may be implemented mechanically or electronically. For example, the "module" or "functional unit" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the controller 520), the one or more processors may perform functions corresponding to the instructions. The computer-readable storage medium may be, for example, a memory included in the storage 530.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium has stored therein instructions that, when executed by at least one processor, are configured to cause the at least one processor to perform at least one operations including receiving at least one information of at least one first electronic device from the at least one first electronic device, determining, from the received information, a current state among a plurality of states that are preset for the first electronic device, and transmitting state expectation information of the first electronic device to a second electronic device if the determined current state satisfies a preset notification condition on a state diagram in which relationships between the plurality of states are set.

According to various embodiments, a storage medium has stored therein instructions that, when executed by at least one processor, are configured to cause the at least one processor to perform at least one operations including receiving at least one information of at least one first electronic device from the at least one first electronic device, determining, from the received information, a current state among a plurality of states preset for the first electronic device, and outputting state expectation information of the first electronic device if the determined current state satisfies a preset notification condition on a state diagram in which relationships between the plurality of states are set.

The embodiments disclosed in the present specification and drawings have been provided to easily describe the present disclosure and to help understanding of the present disclosure, and are not intended to limit the scope of the present disclosure. Therefore, it should be construed that the scope of various embodiments of the present disclosure includes any change or other various embodiments based on the technical spirit of the present disclosure as well as the embodiments described herein.

What is claimed is:

1. A server for providing information of an electronic device, the server comprising:
    a communicator configured to receive at least one information of at least one first electronic device from the at least one first electronic device; and
    a controller configured to determine, from the received information, a current state among a plurality of states that are preset for the first electronic device and to transmit state expectation information of the first electronic device to a second electronic device if the determined current state satisfies a preset notification condition on a state diagram in which relationships between the plurality of states are set,
    wherein the state expectation information indicates at least one state to which the first electronic device is expected to transition from the current state according to the state diagram.

2. The server of claim 1, wherein a preset state transition condition is set between at least two states among the plurality of states on the state diagram.

3. The server of claim 1, wherein the state expectation information transmitted to the second electronic device comprises information about the at least one state and time information about an expected time required for the first electronic device to make transition from the current state to the at least one state.

4. The server of claim 3, wherein the state expectation information transmitted to the second electronic device comprises information related to prevention corresponding to abnormality information expected in the first electronic device.

5. The server of claim 1, wherein the state expectation information transmitted to the second electronic device comprises at least one of information related to battery discharging, information related to sound output, information related to light out, information related to a navigator, and information related to transition to a power saving mode.

6. The server of claim 1, wherein the setting of the relationships between the plurality of states is performed by analyzing a life cycle corresponding to a use pattern of a user from the information received from the at least one first electronic device.

7. The server of claim 1, wherein the controller is further configured to control the first electronic device to output the state expectation information to be transmitted to the second electronic device.

8. A method for providing information of an electronic device at a server, the method comprising:
    receiving at least one information of at least one first electronic device from the at least one first electronic device;

determining, from the received information, a current state among a plurality of states that are preset for the first electronic device; and transmitting state expectation information of the first electronic device to a second electronic device if the determined current state satisfies a preset notification condition on a state diagram in which relationships between the plurality of states are set, wherein the state expectation information indicates at least one state to which the first electronic device is expected to transition from the current state according to the state diagram.

9. The method of claim 8, wherein a preset state transition condition is set between at least two states among the plurality of states on the state diagram.

10. The method of claim 8, wherein the state expectation information transmitted to the second electronic device comprises information about the at least one state and time information about an expected time required for the first electronic device to make transition to the at least one state.

11. The method of claim 10, wherein the state expectation information transmitted to the second electronic device comprises information related to prevention corresponding to abnormality information expected in the first electronic device.

12. The method of claim 8, wherein the state expectation information transmitted to the second electronic device comprises at least one of information related to battery discharging, information related to sound output, information related to light out, information related to a navigator, and information related to transition to a power saving mode.

13. The method of claim 8, wherein the setting of the relationships between the plurality of states is performed by analyzing a life cycle corresponding to a use pattern of a user from the information received from the at least one first electronic device.

14. The method of claim 8, further comprising outputting, by the first electronic device, the state expectation information of the first electronic device.

* * * * *